May 15, 1928.

P. W. YOUNGBLOOD

METHOD OF TAKING COMPOSITE MOTION PICTURES

Filed Feb. 17, 1926

Inventor
Paul W. Youngblood.
By Lyon & Lyon
Attorneys

Patented May 15, 1928.

1,669,963

UNITED STATES PATENT OFFICE.

PAUL W. YOUNGBLOOD, OF LOS ANGELES, CALIFORNIA.

METHOD OF TAKING COMPOSITE MOTION PICTURES.

Application filed February 17, 1926. Serial No. 88,844.

This invention relates to photographic methods wherein miniatures of scenes are employed in conjunction with actors, the miniature being placed between the actor and the camera so that when the entire subject is photographed, the picture on the film will be a composite of the images of the miniature and actor.

An object of the invention is to minimize the expense in the photographing of more or less elaborate scenes as it eliminates the necessity of constructing large sets.

Another object is to provide an inexpensive method whereby foreign buildings and landscapes can be utilized to good advantage in the making of motion pictures without the necessity of the actors traveling to the location of said foreign buildings and landscapes.

A further object of the invention is to provide a method by which the actor, though actually behind the plane of the miniature, may be represented in the completed picture as though he were in front of a portion of the scene represented by the miniature.

Other objects and advantages will appear in the subjoined detailed description.

The accompanying drawings illustrate the invention.

Figure 1:
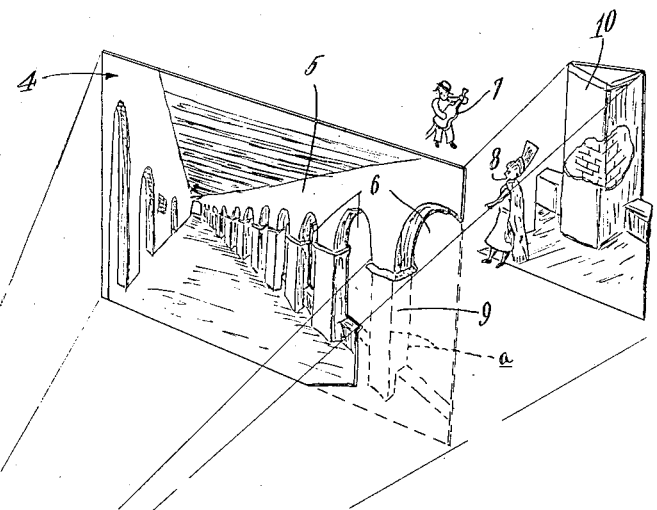
Figure 1 is a perspective view of an apparatus capable of performing some of the operations of the method embodying the invention.

The method is not limited to being performed by the apparatus shown in the accompanying drawings and it is to be understood that said apparatus is only typical of those that may be used to perform the new method. This apparatus is constructed as follows: There is provided a motion picture camera 3, and positioned comparatively near to said camera is a photographic enlargement 4. Preferably the photographic enlargement 4 is a photograph of some natural or artificial scene 5 having cut-away portions to form openings 6 through which the actors, indicated at 7, 8, are exposed to the camera lens, the essential thing being that the object or objects to be represented in the photographic enlargement are reproduced on a smaller scale than natural size. For example, the photographic enlargement 4 may be three feet by four and a half feet.

It will be noted that the actors 7, 8 are positioned behind the plane of the photographic enlargement 4. This, of course, is necessary in order that the actors will appear in the finished picture in proper perspective. The actors being life-size, if they were placed in front of the photographic enlargement, would show in the finished picture out of proportion with the objects shown in the miniature.

It is usually desirable to have the finished picture showing the image of the actor or actors as though the actor was positioned in front of the plane of a portion of the scene represented by the photographic enlargement and, accordingly, I may modify the photographic enlargement 4 still further by omitting or cutting away a portion of the scene to leave an opening 9. In the instance shown in Fig. 1, the portion cut away is the representation of one of the arch abutments, as indicated in broken lines. The portion that is cut away or omitted from the photographic enlargement 4, to leave the opening 9, is reproduced photographically on a larger scale and is indicated at 10 and hereinafter will be referred to by the term "second photographic enlargement". It is to be understood that the photographic enlargement 10 may be merely a photographic enlargement of that portion of the photographic enlargement that is cut away or omitted to produce the opening 9. Sets made by hand have heretofore been used in combination with a photographic enlargement of objects on a miniature scale, with the action taken in front of the plane of the set and behind the plane of the photographic enlargement, but I secure superior results by utilizing instead of such hand made set, a photographic enlargement representing the objects in their natural size. By doing so, I obtain absolute accuracy in color tone and in the matching of the perspective lines of the objects represented in the second photographic enlargement with the objects represented in the smaller photographic enlargement 4. These things are very essential for securing the proper illusion and it is almost impossible to construct a set by hand that will harmonize in tone and perspective lines with the photographic enlargement representing the foreign scene.

The full size photographic enlargement 10 will be placed a sufficient distance from the camera and behind the photographic enlargement 4 so as to be within the proper perspective relation with the opening 9 when the photographic enlargement is viewed through the lens of the camera. The actor 8 appears between the plane of the photographic enlargement 4 and the plane of the photographic enlargement 10.

To perform the method, then, the photographic enlargement 4 will be made, for example, by first making a photograph of a scene. A photographic enlargement will then be made of said photograph or of certain portions thereof in a manner well understood in the photographic art. That is to say, the photographic enlargement may, when completed, omit a portion of the scene originally photographed, as in Fig. 1 one of the arch abutments is omitted, as indicated by the dotted lines $a$. Then the photographic enlargement 10 will be made, for example, by making a second photographic enlargement of another portion of the photograph. In Fig. 1, such other portion is the arch abutment omitted from or cut out of the first enlargement. This second enlargement is a full size reproduction of the objects photographed. The photographic enlargements will then be placed in the field of view of the camera 3 at such distances from the camera as to bring the larger photographic enlargement into the proper perspective relation with the portions of the smaller photographic enlargement that represent those portions of the scene contiguous to the portion of the scene represented by the larger photographic enlargement.

Figure 2:
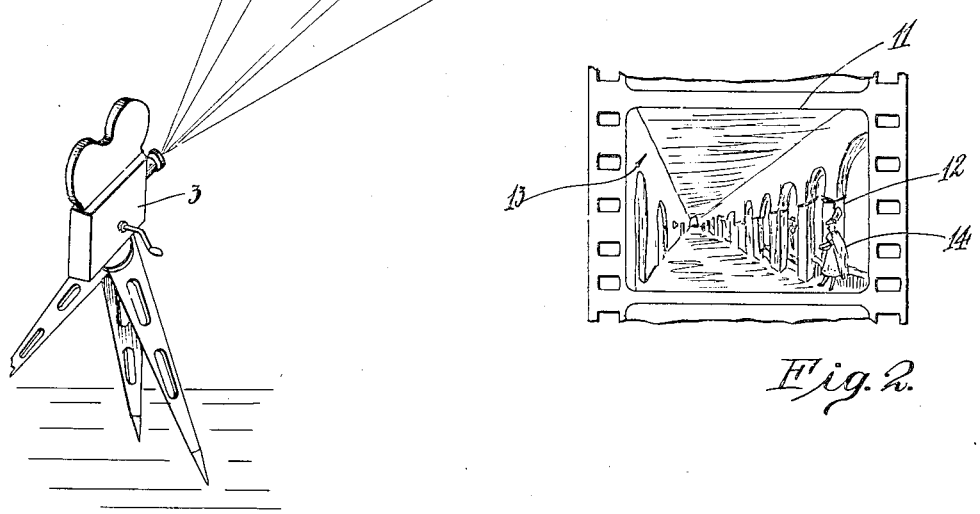
Figure 2 is an enlarged fragmental view of the developed film that has been exposed in the apparatus shown in Fig. 1.

The parts of the apparatus being in the positions shown in Fig. 1, the actors will proceed with their act and the motion picture camera 3 will be operated in the usual manner to expose the film therein and make a series of photographic exposures of the miniature or smaller photographic enlargement and of the action and of the portions of the set or larger photographic enlargement obscured by the action. When this film is developed there will appear thereon a series of frames or pictures 11 and each picture will be a composite of the images of the miniature 4, set 10 and actors 7, 8. It will be seen in Fig. 2 that the image 12 of the set 10 appears in its proper relation with the image 13 of the miniature 4 and, consequently, that the image 14 of the actor 8 appears to be within the structure represented by the miniature 4.

A great advantage of this method is the extreme accuracy and the ease with which scenic matter extraneous to the environment of the actor or actors may be utilized in the production of motion pictures, thus greatly minimizing money expenditures for securing the desired picture environment of the actor.

I claim:

The photographic method consisting in making a photograph of a scene, making a photographic enlargement of certain portions of the photograph, making a second photographic enlargement of another portion of the photograph on a scale corresponding to that of the objects photographed, placing the photographic enlargements in the field of view of a cinematographic camera and at such distances from the camera as to bring the larger photographic enlargement into the proper perspective relation with the portions of the smaller photographic enlargement that represent those portions of the scene contiguous to the portion of the scene represented by the larger photographic enlargement, causing action to take place between the planes of the enlargements, and making a series of photographic exposures of the smaller photographic enlargement and the action and the portions of the larger photographic enlargement not obscured by the action.

Signed at Los Angeles, California, this 6th day of February, 1926.

PAUL W. YOUNGBLOOD.